(12) United States Patent
Seaton

(10) Patent No.: US 7,641,240 B2
(45) Date of Patent: Jan. 5, 2010

(54) PRESSURE JOINT FOR PIPES

(75) Inventor: Jonathan David Seaton, Rugby (GB)

(73) Assignee: Alstom Technology Ltd., Baden (CH)

( * ) Notice: Subject to any disclaimer, the term of this patent is extended or adjusted under 35 U.S.C. 154(b) by 526 days.

(21) Appl. No.: 11/351,395

(22) Filed: Feb. 10, 2006

(65) Prior Publication Data

US 2006/0202479 A1 Sep. 14, 2006

(30) Foreign Application Priority Data

Feb. 11, 2005 (GB) ................................ 0502814.7

(51) Int. Cl.
*F16L 23/00* (2006.01)
(52) U.S. Cl. ................ 285/368; 285/337; 285/341; 285/343; 285/412
(58) Field of Classification Search ................ 285/332, 285/332.1, 332.2, 337, 339–343, 351, 368, 285/412, 413, 98, 235–236, 415
See application file for complete search history.

(56) References Cited

U.S. PATENT DOCUMENTS

| | | | | |
|---|---|---|---|---|
| 381,966 A | * | 5/1888 | Story | 285/342 |
| 546,314 A | * | 9/1895 | Farrey | 285/334.2 |
| 663,879 A | * | 12/1900 | Gallup | 277/623 |
| 931,296 A | * | 8/1909 | Hammon | 285/3 |
| 1,310,740 A | * | 7/1919 | Coffey | 285/342 |
| 1,805,335 A | * | 5/1931 | Kermode et al. | 277/618 |
| 1,813,529 A | * | 7/1931 | Clark | 285/342 |
| 2,460,032 A | * | 1/1949 | Risley | 285/233 |
| 2,995,388 A | * | 8/1961 | Morello, Jr. et al. | 285/340 |
| 3,091,483 A | * | 5/1963 | Hruby, Jr. | 285/95 |
| 3,398,978 A | * | 8/1968 | Gasche | 285/187 |
| 3,986,731 A | * | 10/1976 | DeHoff | 285/81 |
| 4,626,002 A | | 12/1986 | Hagemeister et al. | |
| 5,069,490 A | * | 12/1991 | Halen, Jr. | 285/337 |
| 5,100,183 A | * | 3/1992 | Montesi et al. | 285/337 |
| 6,773,040 B2 | * | 8/2004 | Saito et al. | 285/337 |

FOREIGN PATENT DOCUMENTS

| | | |
|---|---|---|
| DE | 1032624 | 6/1958 |
| DE | 2104860 | 8/1972 |
| DE | 2909265 | 9/1979 |
| DE | 3401569 | 7/1985 |
| GB | 556010 | 9/1943 |
| GB | 784821 | 10/1957 |

OTHER PUBLICATIONS

German Search Report, DE 2006 005 259.5, mailing date Jul. 14, 2008 (with brief translation).

* cited by examiner

*Primary Examiner*—Aaron M Dunwoody
*Assistant Examiner*—Fannie Kee
(74) *Attorney, Agent, or Firm*—Darby & Darby

(57) ABSTRACT

A removable pressure sealing assembly for connecting two pipes includes a single piece cylindrical cover placed over a gap between the pipes, the pipes being aligned with each other. Various annular seals are positioned on the pipes to create a sealing mechanism in the gap between the cover and the pipes before the cover is finally positioned over the gap between the ends of the pipes. Once the annular seals are correctly positioned, the cover can be moved over the gap and end piece rings bolted to both the pipes and the cover to secure the assembly in place.

20 Claims, 6 Drawing Sheets

PRESSURE JOINT FOR PIPES

Priority is claimed to Great Britain Patent Application No. GB0502814.7, filed on Feb. 11, 2005, the entire disclosure of which is incorporated by reference herein.

The present invention relates to the field of pipe joints. Particularly, but not exclusively, the present invention relates to joints using a pressure seal to connect two pipes under high pressure and/or at high temperatures, for instance inlet pipes carrying steam for use in turbines.

BACKGROUND

When connecting together pipes 1, 2 that carry steam, it is customary to connect the pipes 1, 2 using bolted flanges 11, 12, as shown in FIG. 1. The ends of the pipes 1, 2 form matching flanges 11, 12 with bolt holes provided around each flange, through which bolts 13, 14 are provided, connecting the pipes 1, 2. The steam passing through the pipes 1, 2 is under pressure, and acts to force the joint apart. The tightened bolts 13, 14 resist this steam pressure, sealing the joint at the abutting raised faces of the flanges 11, 12 and allowing the steam to pass across the joint.

The bolts 13, 14 are usually made from alloy steel, but due to the use of alloy steel they have a limited life when exposed to conventional superheated steam turbine temperatures (up to 565° C.). Exposed to these conditions, the bolts suffer creep relaxation and eventually the seal formed at the joint by the bolted flange weakens so that steam can escape at the joint, as it is no longer fully sealed.

At higher temperatures, i.e. above 565° C., heat resistant alloys such as Nickel-Cobalt nimonic alloys have to be considered for use in making the bolts. However, the disadvantage of making the bolts using this material is that they are expensive.

One solution that has been proposed is the use of threaded connectors 22 to secure an annular cover 20 over the abutting ends of a curved pipe 1 and a straight pipe 2 as shown in FIGS. 2a and 2b. FIG. 2a shows the assembly prior to the fitting of the cover 20. FIG. 2b shows the assembly after fitting the cover 20.

Prior to fitting the cover 20, as shown in FIG. 2a, each axial end of the cover 20 is held in place over the straight pipe 2 using two retaining rings 21, 28. There are a plurality of axially oriented threaded bores in the radially outer portions of the two retaining rings 21, 28, through which pass respective adjustable threaded connectors 22. The adjustable threaded connectors 22 are threaded cylindrical bars, and secure the two retaining rings 21, 28 in place. The adjustable threaded connectors 22 are mounted on the segmented projecting rings 23, 24, through a plurality of axially oriented threaded bores in the segmented projecting rings 23, 24, and are fixed at either side of the bores with bolts 27. The radially inner ends of the segmented projecting rings 23, 24 are mounted in recessed grooves 25, 26 provided in the respective pipes. The recessed grooves 25, 26 are located a short distance away from the respective ends of the pipes 1, 2, towards the main body of the pipes 1, 2. The projecting segmented rings 23, 24 in the recessed grooves 25, 26, connected by the threaded connectors 22, fix the assembly to both pipes 1, 2 and assist in holding the respective ends 20c, 20g of the pipes 1, 2 together.

The pipes 1, 2 have flanges 29a, 29b near their respective contacting ends, and these flanges 29a, 29b extend axially along each pipe but not to the end of each pipe. When the pipes 1, 2 are abutting, a groove 29 is defined by the axial gap created between the pipe flanges 29a, 29b when the ends of the pipes 1, 2 abut. A key or keys 20e is inserted into the groove 29 and is fixed using bolts. The function of the key 20e is to fix the orientation of the pipes 1, 2 relative to one another by transmitting any torque from one pipe to another, preventing relative rotational movement.

The cover 20 has, on the part of its radially inner facing surface that will lie over curved pipe 1, a female threaded connector surface 20a. Curved pipe 1 has a co-operating male threaded connector surface 20b located on the radially outer facing surface of the end portion of the pipe 1 to be covered by the cover 20.

To seal the pipes 1, 2 together, the cover 20 is moved from its position on the straight pipe 2 to cover both pipes 1, 2. This is done by rotating the threaded connectors 22, causing the retaining rings 21, 28 to move axially, until the female threaded connector surface 20a on the inside surface of the cover 20 begins to engage the male threaded connector surface 20b on the outside surface of the ends of curved pipe 1. Once these threaded surfaces 20a, 20b are engaged, they are tightened by rotating the cover 20 about the axial centre line of the pipes 1, 2. This is done using a generic tool suitable for rotating the cover co-operating with a bolt 20d (FIG. 2b) projecting from the cover 20. Thread engagement and tightening is aided by the cover 20 being held concentric to the centreline of the pipes 1, 2 by retaining rings 21 and 28. For this tightening to take place, cover 20 has to be rotated about the axial centre line of the pipes 1, 2 whilst retaining rings 21,28 slide axially on threaded connectors 22. The cover 20 is formed having a radially inward facing flange, provided on the inner surface of the end of the cover 20 that lies over straight pipe 2 when the cover 20 is in place connecting the pipes 1, 2. After fitting the cover 20, as described above and shown in FIG. 2b, the raised face of the inward facing flange on the cover 20 abuts the raised face of flange 20f on the straight pipe 2, preventing further axial movement.

Sealing occurs at the raised faces 20c, 20g (FIG. 2a) of the flanges of the pipes 1, 2 due to the compressive force from cover 20.

However, this arrangement has the problem that it is complex to install and not easily removable once installed, requiring a pipe to be cut if it is to be removed. This is because the large diameter threads 20a, 20b are difficult to undo. This is especially the case after the joint has been in operation for any considerable period of time as scale will build up in the assembly. This means that large amounts of torque need to be applied in order to undo the large bolts used, due to the increased friction caused by the scale. Also, for the assembly to work it is required that the pipes are adjacent and of the same diameter.

SUMMARY OF THE INVENTION

An object of the present invention is to overcome one or more of the above problems.

Accordingly, in a first aspect, the present invention provides a pressure joint assembly arranged to seal between first and second pipes having mutually confronting first and second pipe end flanges respectively, the assembly being operative to hold the pipe end flanges in non-abutting fixed relationship to each other and comprising:

a generally cylindrical cover that spans the first and second pipe end flanges and is releasably fixed thereto by means operative to apply an axial compressive force to seal means radially trapped between the first and second pipe end flanges and respective overlying portions of the cover; and first and second retaining means that are axially fixed relative to the first and second pipe end flanges respectively and are operative under the axial compressive force to axially trap the seal means between the first and second retaining means and respective first and second flange means of the cover.

In a preferred embodiment of the invention, to facilitate assembly and disassembly of the joint, at least one of the flange means projecting from the cover is inwardly demountable from the cover while the cover is located over the pipe end flanges.

To maximise sealing efficiency, the seal means are configured to seal with a wedging action when the axial compressive force is applied to the cover. To facilitate the wedging action, the seal means may comprise seal rings having abutments therebetween, the abutments being inclined relative to the axis of the pipe end flanges. We prefer that the abutments are inclined relative to each other such that selected of the seal rings are tapered in the radial direction.

The seal means preferably comprises at least two seal rings on each of the pipe end flanges and may advantageously comprise four seal rings on at least one of the pipe end flanges.

The at least two seal rings may comprise at least a sealing ring and a pressure ring, the sealing ring having an abutment with the pressure ring, the abutment with the pressure ring being inclined to the axis of the pipe end flanges and operative to cause wedging of the sealing ring and the pressure ring in opposing axial and radial directions when the axial compressive force is applied to the cover. A first side of the pressure ring may abut a first side of the sealing ring and a second side of the pressure ring may abut one of the retaining means; furthermore, a second side of the sealing ring may abut one of the flange means that project inwardly from the cover. First and second sides of the sealing ring are preferably inclined towards each other such that the sealing ring is radially tapered.

The four seal rings may comprise two pressure rings and two sealing rings that are positioned between the pressure rings, the sealing rings having respective abutments with the pressure rings, the abutments with the pressure rings being inclined to the axis of the pipe end flanges and operative to cause wedging of the sealing rings and the pressure rings in opposing axial and radial directions when the axial compressive force is applied to the cover. We prefer the two sealing rings to be concentrically arranged, one sealing ring being located radially within the other sealing ring, the abutments of the sealing rings with the pressure rings being inclined towards each other such that the radially inner sealing ring is tapered in the radially outward direction and the radially outer sealing ring is tapered in the radially inward direction. We further prefer that one of the pressure rings abuts one of the flange means of the cover and the other pressure ring abuts one of the retaining means.

Conveniently, the first and second retaining means comprise rings projecting radially outwardly from corresponding recesses in the pipe end flanges.

The cover may be fixed over the pipes by means of end pieces that are bolted to opposing ends of the cover and to the first and second pipe end flanges.

In a second aspect, the present invention provides a pressure joint assembly kit suitable for connecting two aligned pipes having non-abutting pipe end flanges, comprising:

a cylindrical cover securable to the pipe end flanges to hold the pipes rigidly together;

a plurality of seal rings operative to form a fluid tight seal between each pipe end flange and the cover;

a first flange means projecting inwardly from the cover for abutting against one of the seal rings;

a second flange means projecting inwardly from the cover for abutting against another of the seal rings, at least the second inwardly projecting flange means being radially inwardly demountable from the cover while the cover is located over the pipe end flanges;

first and second removable annular retaining means for axially trapping the seal rings between the first and second retaining means and the first and second flange means, respectively, of the cover;

wherein the seal rings and the retaining means have outer diameters that are matched to an inner diameter of the cover such that before mounting of the second inwardly projecting flange means on the cover and after demounting of the second inwardly projecting flange means from the cover, the cover is axially slideable over the seal rings and the retaining means for assembly and disassembly of the joint.

In a third aspect, the invention further provides methods for assembling and disassembling a pressure joint of the above type.

With the benefit of the present invention there is provided a pressure seal joint for joining two pipes carrying fluids, at high temperatures and/or pressures, where the sealing ability of the joint is less prone to being affected by relaxation creep. In addition, the pressure inside the pipes serves to reinforce the sealing of the joint, rather than to force the joint apart.

Further, with the benefit of the present invention, there is also provided a pressure seal joint capable of being fully disassembled for maintenance, and also capable of being reassembled once maintenance is complete.

Another benefit of the present invention is that pipes of different diameters can be joined using a modified joint assembly shaped to fit the different sized pipes.

Further features and advantages of the invention will become apparent from the claims, to which the reader is referred, and from a consideration of the following description of a preferred embodiment of the invention, made with reference to the accompanying drawings in which like reference symbols indicate the same or similar components.

BRIEF DESCRIPTION OF THE DRAWINGS

Exemplary embodiments of the invention will now be described, with reference to the accompanying drawings, in which.

DETAILED DESCRIPTION

Figure 1:
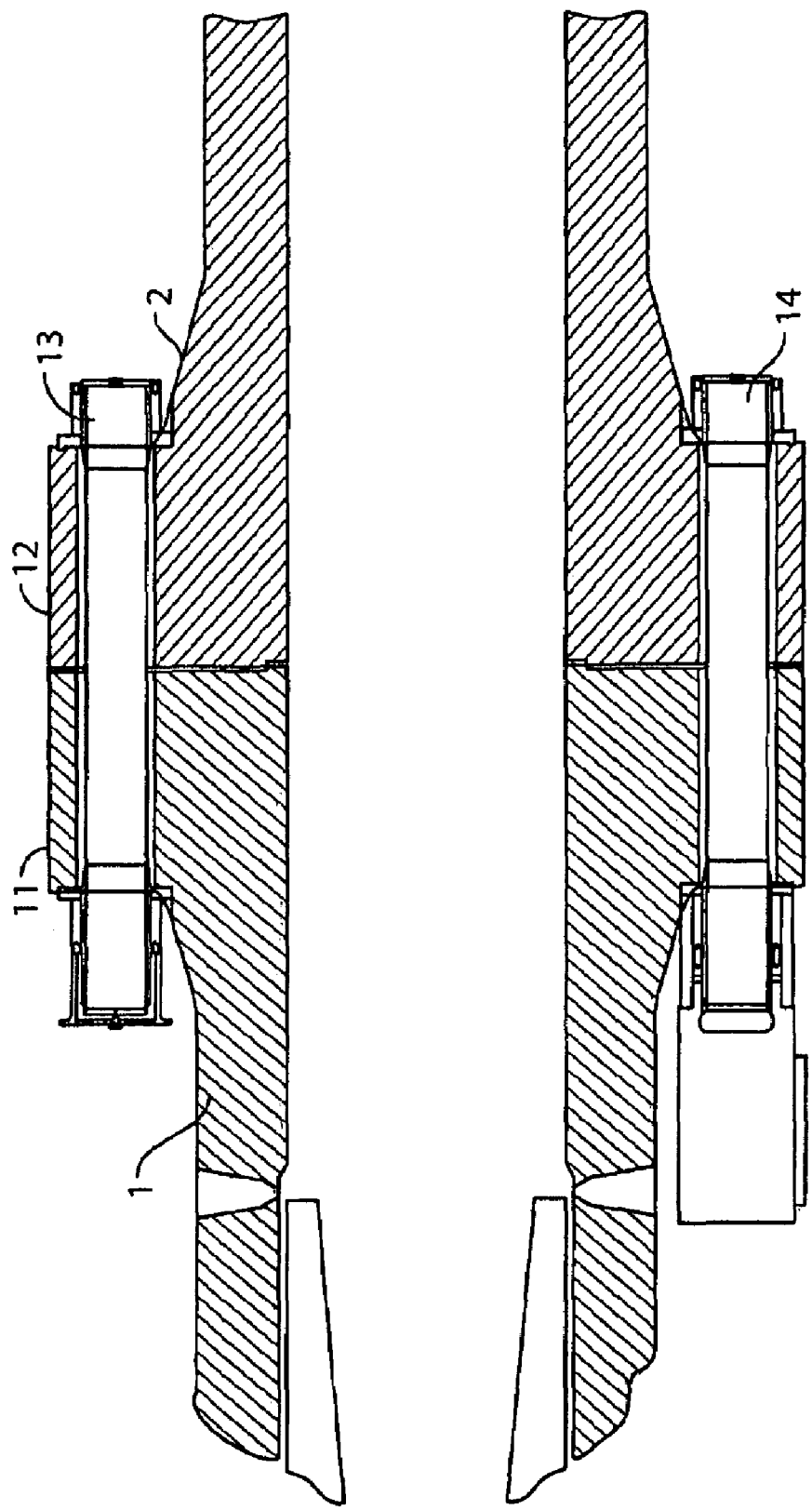
FIG. 1 is a section taken diametrically along the axis of two pipes connected using conventional bolted flanges.
Figure 2A:
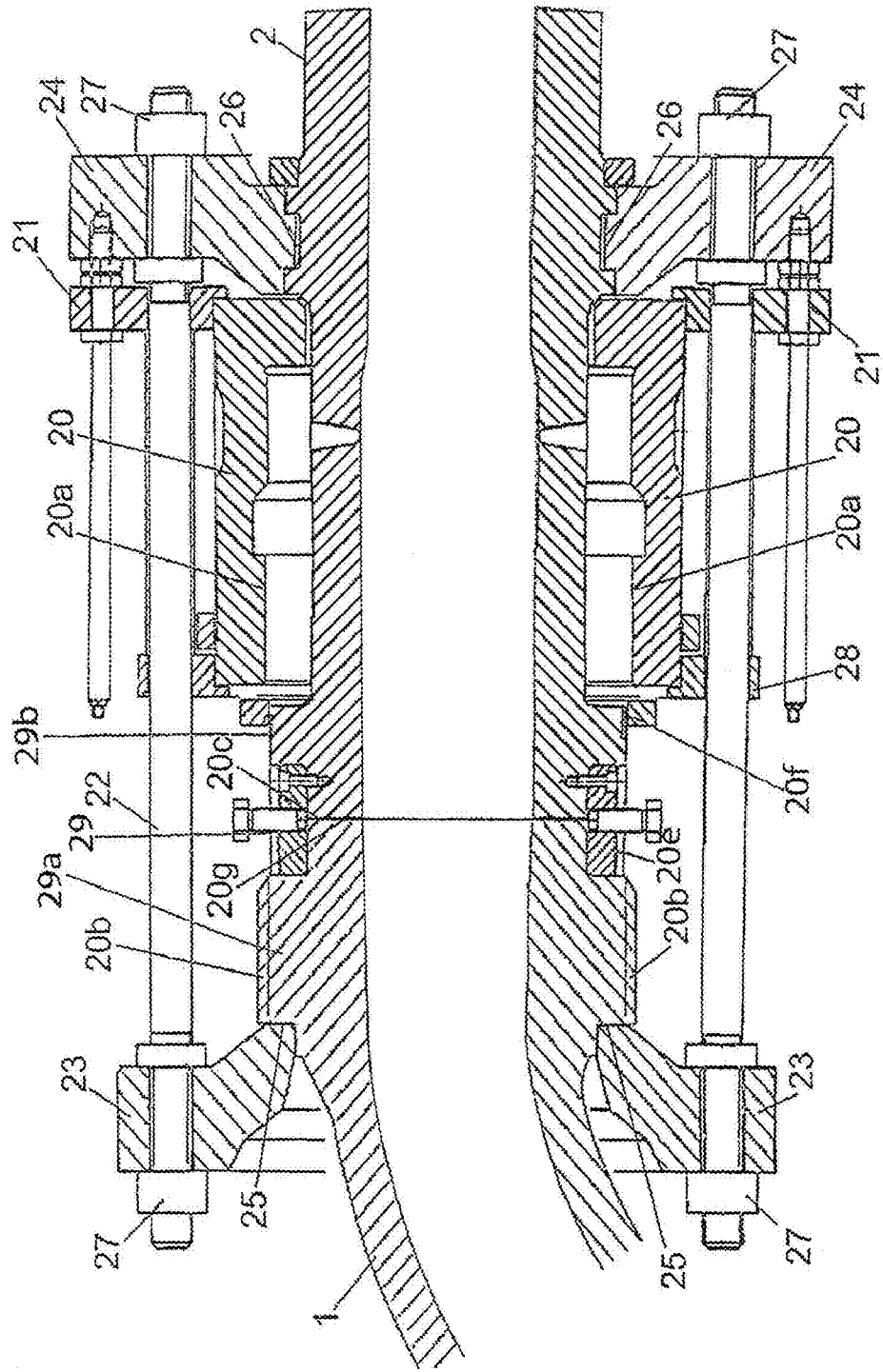
FIG. 2a is a section taken diametrically along the axis of a threaded connector being used to connect a pipe to an inlet pipe on a turbine before the cover is fitted over the joint.
Figure 2B:
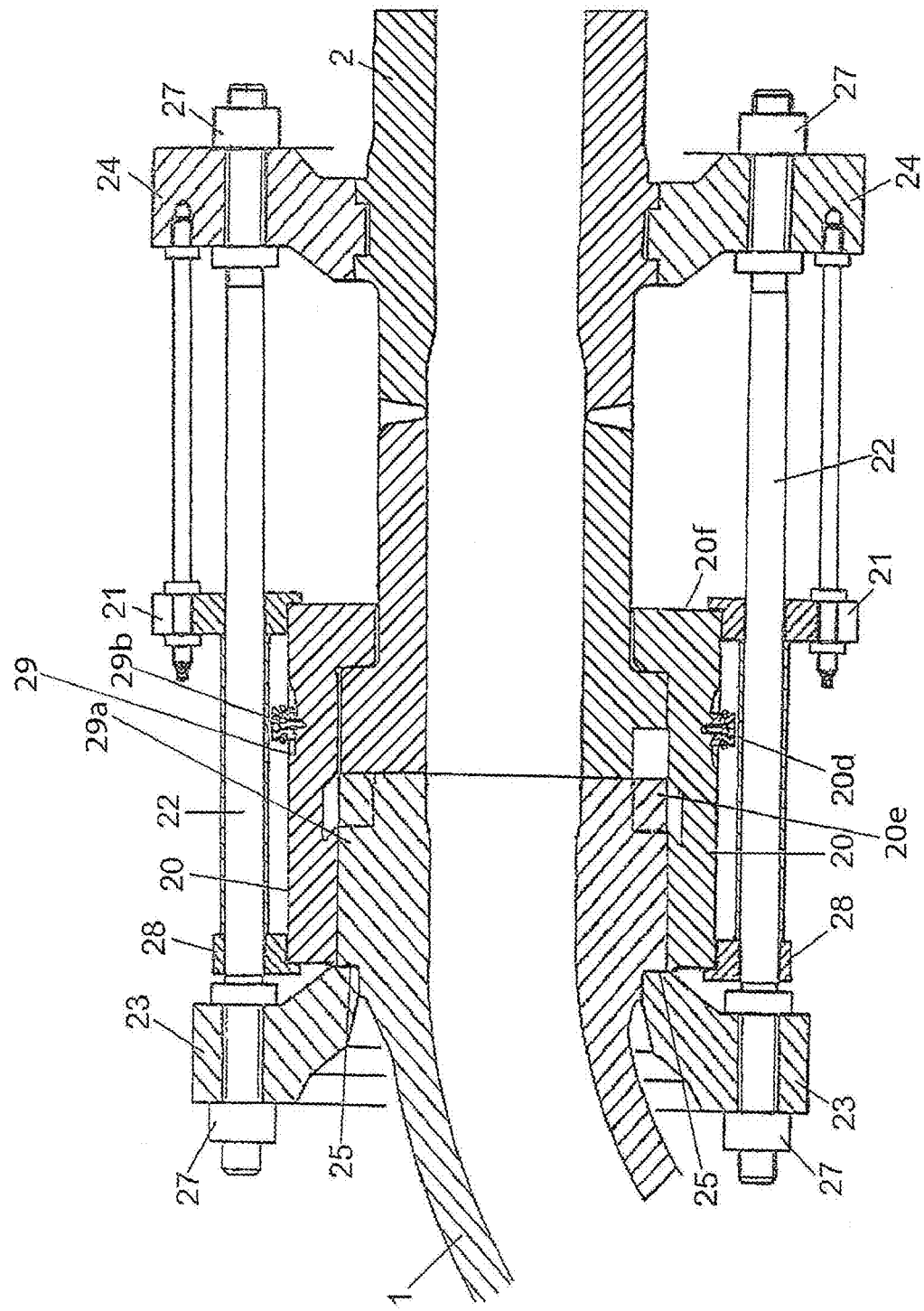
FIG. 2b is a section taken diametrically along the axis of a threaded connector being used to connect a pipe to an inlet pipe on a turbine after the cover is fitted over the joint.

A joint assembly 3 according to the preferred embodiment of the present invention will now be described with reference to FIG. 3.

The joint assembly 3 rigidly connects together a first pipe 1 and a second pipe 2, which are aligned with each other and have a gap 4 in between. The first pipe 1 is connected to a valve mounted on springs, which is in turn connected to a flexible pipe system. A single piece cylindrical cover 30 overlies the gap 4 between flanges 43, 44 which are provided at the ends of the pipes 1, 2. Annular seals in the form of rings 31, 32, 33, 34, 35, 36 are positioned in the gaps between the outer surfaces of flanges 43, 44 and the inner surface of the cover 30 to create a fluid tight seal between each pipe 1, 2 and the cover 30. The rings 31, 32, 33, 34, 35, 36 use a wedging action to seal these gaps: in the case of the first pipe 1 a sealing ring 31 wedges, creating a seal, between the cover 30 and the flange 43 of the first pipe 1; and in the case of the second pipe 2 the rings 32, 33, 35, 36 wedge against each other and against both the cover 30 and the flange 44 of the second pipe 2, creating a seal. Segmented rings 37, 38, positioned in channel shaped grooves 40, 41 in the pipe flanges 43, 44, are used to secure the rings 31, 32, 33, 34, 35, 36 in place. End piece rings 49, 50, in the form of segmented rings, are secured to the respective ends 61, 62 of the cover 30 and to the respective ends 69, 70 of the pipes 1, 2 to secure the cover 30 rigidly in place, preventing axial movement along the axis of the pipes.

Each pipe flange 43, 44 has a radially outward-facing channel shaped groove 40, 41 therein, located halfway along the length of the respective flange 43, 44 surfaces and axially separating these respective surfaces into an innermost flange surface 63, 66 and an outermost flange surface 64, 65. The outermost flange surface 64, 65 is the surface of the flange 43, 44 at the end of the pipe 1, 2 and the innermost flange surface 63, 66 is the surface of the flange 43, 44 nearer the main body of the pipe 1, 2.

The cylindrical cover 30 is formed as a single part and overlies the gap 4 between the flanges 43, 44 such that the cover 30 lies entirely over the pipe flanges 43, 44 and partially over the main lengths of the pipes 1, 2. The cover 30 has an annular flange 42 at its left end (as shown in FIG. 3), projecting radially inwards from the inward facing surface of the cover 30. The inner diameter at the inner cylindrical surface 67 of the annular flange 42 on the cover 30 matches the outer diameter of the pipe flange 43. The inner surface of the annular flange 42 partially contacts the innermost flange surface 63 of the first pipe 1 and partially lies over the main body of the pipe 1. Further, the annular flange 42 has an angled chamfer 51 on the inner corner of its surface 67 for wedging against the sealing ring 31.

At the right end of the cover 30, lying over the second pipe 2, there is a radially inward-facing channel shaped groove 60 in the inner surface of the cover 30, situated a short distance in from the end 61 of the cover 30. A radially-inwardly removable annular flange 39, which is a segmented ring of four to six pieces, is fitted in this channel shaped groove 60. The segmented ring is cut on two planes parallel to, and above and below, a plane passing through the centreline of the pipe joint. This results in two segments which can be slid into place radially, allowing them to fit in place. The diameter of the radially-inward facing surface 68 of the removable annular flange 39 matches the outer diameter of the innermost flange surface 66 of the second pipe 2, but the inner surface 68 of the removable annular flange 39 does not contact the innermost flange surface 66, and overlies the main body of the second pipe 2 with a substantial radial gap.

The end piece rings 49, 50 are semi-circular two-piece rings fitting around the pipes 1, 2, and are used to secure the pipes 1, 2 and the cover 30 in place. Bolts 45, 46, 47, 48 project through the end piece rings 49, 50 into respective ends 61, 62 of the cover 30 and into respective pipe facing ends 69, 70 of the pipe flanges 43, 44, securing the pipes 1, 2 and the cover 30 together using the end piece rings 49, 50. The bolts 45, 46, 47, 48 hold the cover 30 in place when there is no pressure from steam flowing in the pipes. The end piece ring 50, fixing the first pipe 1 to the cover 30, contacts substantially all of the end face 62 of the cover 30, but does not contact the first pipe 1 or the respective pipe facing flange end 69. The end piece ring 49, fixing the second pipe 2 to the cover 30, contacts all of the other end 61 of the cover, but does not contact the second pipe 2 or the respective pipe facing flange end 70. The end piece ring 49 fixing the second pipe 2 also contacts the inner surface 68 of the segmented removable annular flange 39, retaining it, by radial outward pressure, in the channel shaped groove 60 in the cover 30.

In the channel shaped grooves 40, 41 of the first 1 and second pipes 2 there are provided segmented retaining rings 37, 38, partially inserted into the respective channel shaped grooves 40, 41, both made up of two substantially semicircular parts that are bolted together. These project radially from the flanges 43, 44 of the pipes 1, 2, and the diameters of their respective outer facing surfaces match the diameter of the inner surface of the cover 30; however, there is no fluid-tight seal with the cover 30. Additional bolting or bracing can be used to hold the segmented retaining rings 37, 38 in place in the respective channel shaped grooves 40, 41, but this is not absolutely necessary.

The arrangement of the rings 31, 32, 33, 34, 35, 36 used to seal the gaps between the pipes 1, 2 and the cover 30 for the joint assembly 3 will now be described, dealing with each pipe 1, 2 of the joint assembly 3 separately, due to the axially asymmetric design of the joint assembly 3.

Dealing with the left end of the joint assembly 3 located on the first pipe 1: A pressure ring 34 is provided abutting the segmented retaining ring 37. The pressure ring 34 is an annular ring located around the innermost flange surface 63, and has flat annular surfaces contacting the inner surface of the cover 30, the innermost flange surface 63 and the side of the segmented retaining ring 53 facing the main body of the first pipe 1. The pressure ring 34 has a further two flat annular surfaces, with a wedge-shaped cross-section, one 52 of which contacts a surface of a sealing ring 31, the sealing ring 31 also having a wedge-shaped cross-section. The sealing ring 31 is an annular ring provided, in contact, around the innermost flange surface 63 and in contact with a surface of the pressure ring 52 and with a chamfer 51 of the annular flange 42, providing a fluid tight seal between the chamfer 51 and the innermost flange surface 63.

Dealing with the right end of the joint assembly 3 on the second pipe 2: A first pressure ring 36 is an annular ring provided around the innermost flange surface 66 and abutting the segmented retaining ring 38. The first pressure ring 36 has surfaces contacting the inner surface of the cover 30, the innermost flange surface 66 and the side of the segmented retaining ring 54 facing the main body of the second pipe 2. It has a further two surfaces, with a wedge-shaped cross-section, one 55 of which partially contacts a first sealing ring 32, and the second 56 of which partially contacts a second sealing ring 33. There is also a second pressure ring 35 provided, around the innermost flange surface 66, abutting the segmented removable annular flange 39. The second pressure ring 35 is an annular ring and has surfaces contacting the inner surface of the cover 30, the innermost flange surface 66 and a side of the segmented removable annular flange 39. It also has a further two surfaces, with a wedge-shaped cross-section, one of which 57 partially contacts a first sealing ring 32, the second of which 58 partially contacts a second sealing ring 33. The first sealing ring 32 is an annular ring with a wedge-shaped cross-section provided around the innermost flange surface 66, contacting the first 36 and second pressure 35 rings. The second sealing ring 33 is an annular ring with a wedge-shaped cross-section, provided contacting the first 36 and second 35 pressure rings and the inner surface of the cover 30.

The wedging mechanism for creating a fluid tight seal, and for the reinforcing of the seal when fluid under pressure passes from the first pipe 1 to the second pipe 2 (or vice versa), will now be described. The flexibility of the sprung valve and pipe system allows the pipes 1, 2 to be forced apart under fluid pressure, thus allowing the pressure seal to operate.

The fluid in the pipes 1, 2 will be at a higher pressure than the air pressure outside the pipes 1, 2. When the fluid is passing through the pipes 1, 2 connected by the joint assembly 3, the wedge sealing arrangement will reinforce the sealing of the joint.

The basic seal is created by the cover 30, which encloses the gap 4 between the pipes 1, 2, and the rings 31, 32, 33, 34, 35, 36 provided on respective pipes 1, 2, which provide a seal across the gaps between the outer surfaces of the flanges 43, 44 of the pipes 1, 2 and the inner surface of the cover 30.

Figure 5:
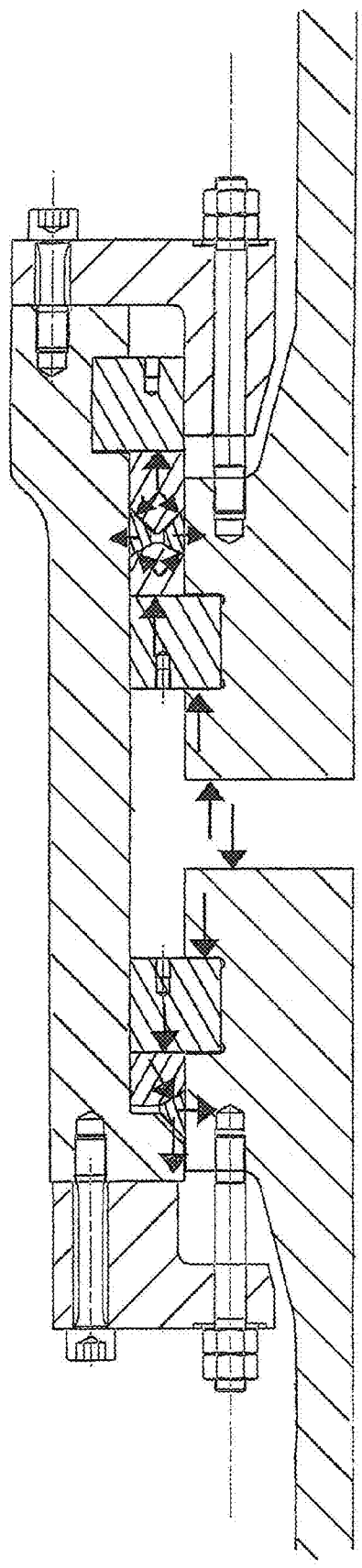
FIG. 5 is a partial section corresponding to FIG. 3 showing the forces acting on the pressure joint when fluid is passing through the pipes connected at the joint.

With reference to FIG. 5, the forces acting on the various components of the joint assembly 3 will now be briefly described, dealing with each side of the joint assembly 3 individually due to its asymmetric design:

At the gap between the cover 30 and the first pipe 1, sealing occurs as follows: pressure from the fluid in the gap 4 between the two pipes 1, 2 forces the pipes 1, 2 apart. Pressure from the fluid in the gap 4 between the two pipes 1, 2 also acts on the exposed surface of segmented retaining ring 37, but because the area of this surface is less than the area of the pipes, the force separating the pipes is larger than the force on the exposed surface of retaining ring 37. Thus the right hand face, as viewed in FIG. 3, of ring 37 contacts flange 43 to react to the pipe force. The steam pressure acting on pipe 1 forces segmented retaining ring 37 towards the first pressure ring 34, and forces the pressure ring 34 away from the gap 4.

The face of the pressure ring 34 forms an inclined surface with a wedge-shaped cross-section (referring to FIG. 3, surface 52 faces towards the axis of the pipes 1, 2 at an angle of about 65° from the axis), with the surface 52 closer to, and angled towards, the axis of the pipes 1, 2 abutting a corresponding face of the sealing ring 31. The surface 52 of the pressure ring 34 exerts a force on the sealing ring 31 as a result, the force acting radially in the direction of the centre of the first pipe 1 and also axially away from the gap 4 between the pipes 1, 2. The sealing ring 31 is thus forced, in a wedging action, to create a seal between the contacting faces of the sealing ring 31 and the chamfer 51 of the annular flange 42 of the cover 30, and between the contacting faces of the sealing ring 31 and the innermost flange surface 63 of the first pipe 1.

At the gap between the cover 30 and the second pipe 2, sealing occurs as follows: pressure from fluid in the gap 4 between the two pipes 1, 2 forces the pipes 1, 2 apart. Pressure from the fluid in the gap 4 between the two pipes 1, 2 also acts on the segmented retaining ring 38, but because the area is less than the area of the pipes, the force separating the pipes is larger than the force on the retaining ring 38. Thus the left hand face of ring 38 contacts flange 44 (as viewed in FIG. 3) to react to the pipe force.

The steam pressure acting on pipe 2 forces segmented retaining ring 38 towards the first pressure ring 36, and forces the pressure ring 36 away from the gap 4. Due to this force, the two inclined faces 55, 56 with wedge-shaped cross-section (referring to FIG. 3, one face 56 is facing away from the axis of the pipes 1, 2, angled at about 65°, clockwise, from the axis, the other face 55 facing towards the axis of the pipes 1, 2 is angled at about 115° from the axis) of first pressure ring 36 that contact the first and second sealing rings 32, 33 exert both a radial and axial force on the sealing rings 32, 33. The radial force, when applied to the contacting surfaces of the sealing rings 32, 33, forces the first sealing ring 32 radially inwards towards the innermost flange surface 66 and the second sealing ring 33 radially outwards towards the inner surface of the cover 30, creating a seal. The axial force reinforces the seal, as the second pressure ring 35 does not have any scope for movement, because it abuts the segmented removable annular flange 39, which is rigidly mounted in the channel shaped groove 60 of the cover 30, and the second pressure ring 35 is positioned flush with a face 59 of the segmented removable annular flange 39. Therefore, when the sealing rings 32, 33 have an axial force applied by the first pressure ring 36 in the direction of the second pressure ring 35, the reaction force from the faces 57, 58 with wedge-shaped cross-section (referring to FIG. 3, one face 58 is facing away from the axis of the pipes 1, 2, angled at about 65° from the axis, the other face 57 facing towards the axis of the pipes 1, 2 is angled at about 115° from the axis) of the second pressure ring 35 equals any axial force directed from the first pressure ring 36 through the sealing rings 32, 33. This also results in the radial component of the reaction force reinforcing the respective radial forces on the sealing rings 32, 33 in the direction of the inner surface of the cover 30 and innermost flange surface 66. This co-operation of the sealing rings 32, 33 thus seals the gap between the second pipe 2 and the cover 30 through the co-operation of the pressure rings 35, 36 wedging the sealing rings towards the pipe 2 and cover 30 respectively.

In this embodiment, to assemble the joint assembly 3, the following method is used:

First, the cover 30 is slid onto the first pipe 1, such that it is positioned away from the end of the pipe 1 where the gap 4 between the pipes 1, 2 will be sealed, and where it does not obstruct the assembly of the rest of the joint assembly 3. The end 62 of the cover 30 with the annular flange 42 must be situated furthest away from the end of the first pipe 1 which is to be joined.

Then, the sealing and pressure rings 31, 32, 33, 34, 35, 36 are placed on the pipes 1, 2. The first pipe 1 has one sealing ring 31 and one pressure ring 34 placed on the innermost flange surface 66. The second pipe 2 has one pressure ring 35 placed on the innermost flange surface 66, then two sealing rings 32, 33 (one 33 on top of the other 32) placed on the innermost flange surface 66, and finally another pressure ring 36 placed on the innermost flange surface 66.

Now, the two pipes 1, 2 are moved into position so that they are aligned with each other in preparation for the joint to be made.

Next, the segmented retaining rings 37, 38 are fitted in the channel shaped grooves 40, 41 in the pipe flanges 43, 44. The components of each retaining ring 37, 38 are bolted together to ensure that they stay in place when the cover 30 is positioned later.

Now the sealing rings 31, 32, 33 and pressure rings 34, 35, 36 are slid axially so as to be positioned in the correct places on the respective pipes 1, 2. On the first pipe 1, the pressure ring 34 is moved to abut the segmented retaining ring 37, and then the sealing ring 31 is moved to abut the pressure ring 34.

On the second pipe 2, the first pressure ring 36 is moved to abut the segmented retaining ring 38, then the two sealing rings 32, 33 are arranged to contact the first 32 and second 33 sealing ring contacting surfaces 55, 56 of the first pressure ring 36, and finally the second pressure ring 35 is moved to abut the two sealing rings 32, 33 such that the first 32 and second sealing ring 33 contacting surfaces 57, 58 of the second pressure ring 35 contact the first and second sealing rings 32, 33.

Next, the cover 30 is moved along the first pipe 1 into position such that the chamfer 51 of the annular flange 42 of the cover 30 contacts the sealing ring 31 on the innermost flange surface 63 of the flange 43 of the first pipe 1.

Figure 3:
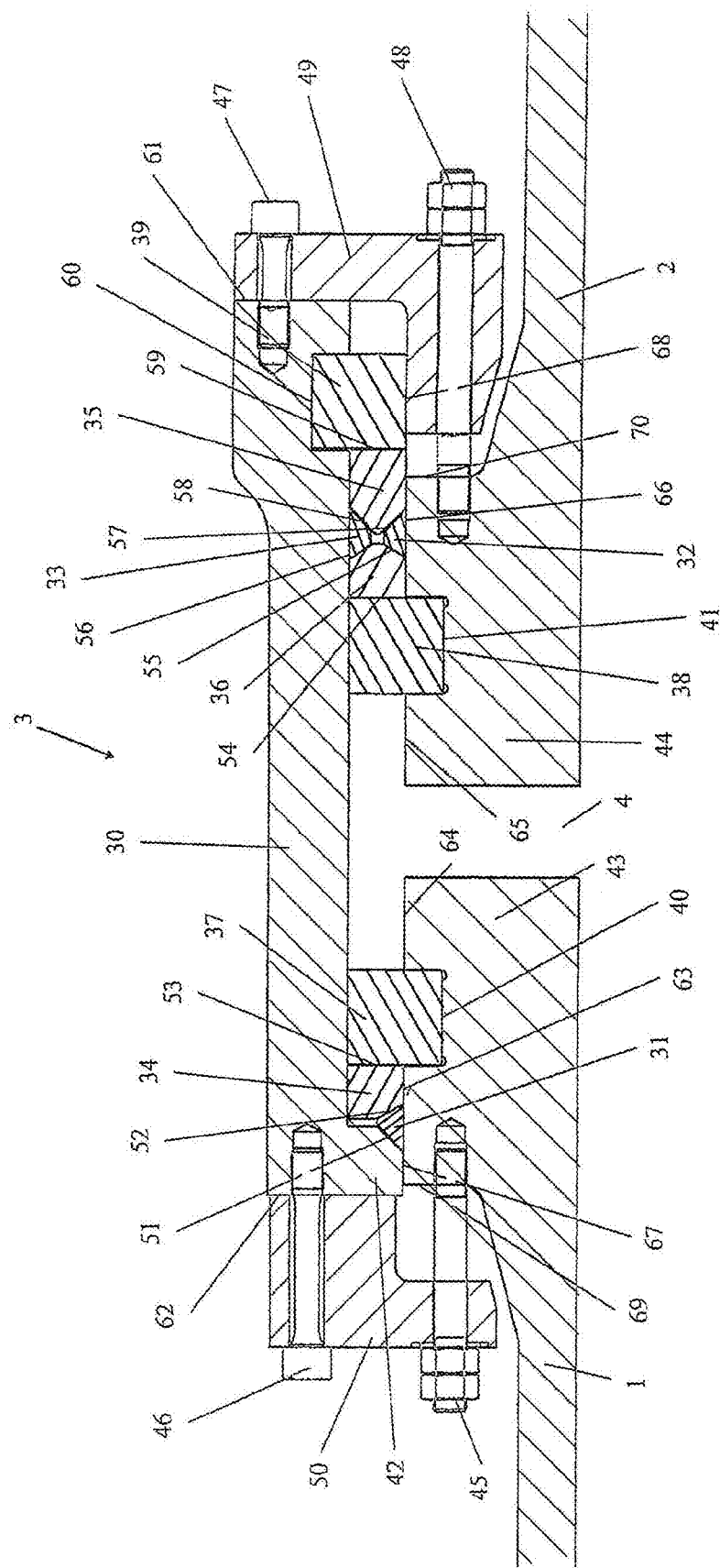
FIG. 3 is a partial section taken diametrically along the axis of a pressure seal joint according to the preferred embodiment.
Figure 4:
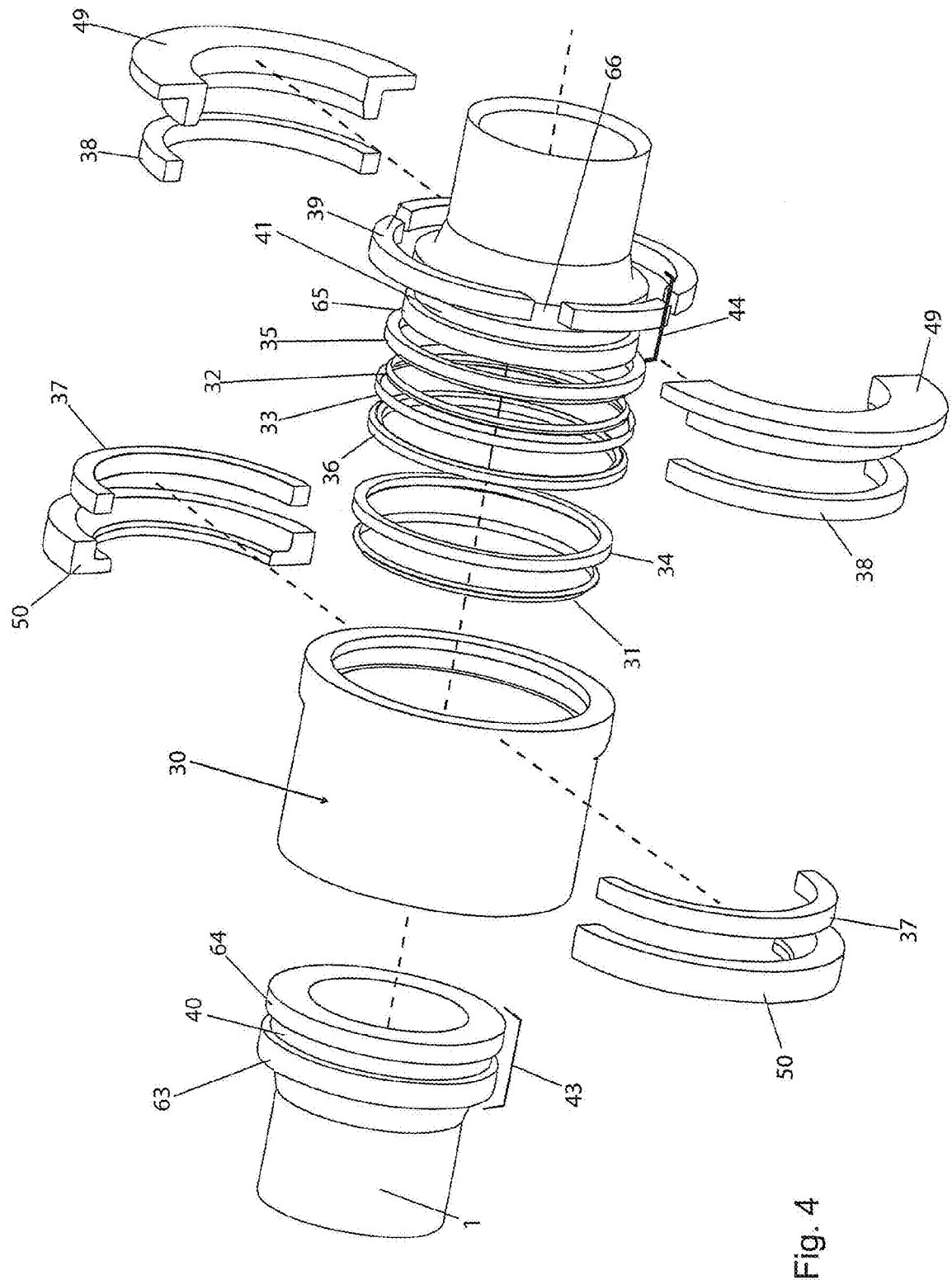
FIG. 4 is a perspective exploded view showing disassembled the pressure seal joint and the separated component parts of the joint of FIG. 3.

With the cover 30 positioned as shown in FIG. 3, the segmented removable annular flange 39, which is a four to six piece ring, is assembled in the channel shaped groove 60 in the inner surface of the cover 30, as the cover 30 is now in position over the second pipe flange 44. The ring is cut on two planes parallel to, and above and below, a plane passing through the axial centreline of the pipe joint. This results in two segments which can be slid into place radially.

Finally, the two cover-retaining end piece rings 49, 50 are fitted. Bolts 45, 46, 47, 48 are then fastened through the end piece rings 49, 50 into the ends 61, 62 of the cover 30 and also through the end piece rings 49, 50 into the pipe facing ends 69, 70 of the flanges 43, 44.

The joint assembly 3 can be disassembled using essentially the same method as described above when assembling the joint assembly 3, but in reverse. The two end piece rings 49, 50 are removed first, followed by the removal of the segmented removable annular flange 39 by first removing the segments that can be extracted radially from the channel shaped groove 60 in the inner surface of the cover 30. The cover 30 can then be moved axially, away from the gap 4 in the pipes 1, 2, and positioned on the main body first pipe 1. The segmented retaining rings 37, 38 are then removed from the channel shaped grooves 40, 41 in the pipe flanges 43, 44, enabling the sealing 31, 32, 33 and pressure rings 34, 35, 36 to be removed from the pipes 1, 2. Now the pipes 1, 2 can be moved apart and the cover 30 fully removed from the first pipe 1.

In the preferred embodiment, the first pipe 1 is a loop pipe that serves as a steam inlet pipe for a steam turbine, and the second pipe 2 is a loop pipe connected to a steam inlet valve. These two pipes 1, 2 need connecting to provide steam from the steam inlet valve to the steam turbine. The joint assembly 3 is particularly advantageous when used with pipes 1, 2 carrying fluid under high pressure (over 200 bar) and/or temperature (over 565° C.), such as in this example.

It is, however, envisaged that the joint assembly 3 can be used with pipes 1, 2 in different arrangements and combinations. For instance the pipes 1, 2 in the example above can, simply, be exchanged 2, 1. It is also envisaged that the pipes 1, 2 to be connected can have different functions from those mentioned in this example, such as in other power generation and petro-chemical applications.

Another alternative embodiment features the cover 30 having two segmented removable annular flanges provided at respective ends of the inside surface of the cover 30, in place of the single segmented removable annular flange 39 and annular flange 42 of the cover 30 according to the preferred embodiment. This has the advantage that the cover 30 can be moved, when the joint is disassembled, onto either of the pipes 1, 2 it joins. However, it involves more parts and is more complex to assemble.

A further alternative embodiment is that the assembly can be adapted to be used with pipes of differing diameters, through the use of components of suitable sizes to adapt to having a larger or smaller first or second pipe. For example, if the diameter of the second pipe is larger than that of the first pipe, the cover would need a diameter larger than this larger second pipe diameter. The annular flange of each end of the cover would have to extend to the flanges of the pipes, and the rings and retaining rings on the pipes would have to reach the inner surface of the cover. This would mean that the side of the joint assembly fitting the smaller pipe would need larger rings and an annular flange, fixed or removable, with diameters and sizes appropriate to the smaller pipe. Alternatively, the cover could be designed to be constricted in diameter at one end, enabling the use of standard rings and retaining rings for both pipes, but this would restrict the circumstances in which the joint could be (dis-)assembled, involve more parts and be more complex to assemble.

The present invention has been described above purely by way of example, and modifications can be made within the scope of the invention as claimed. The invention also consists in any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Any discussion of the prior art throughout the specification is not an admission that such prior art is widely known or forms part of the common general knowledge in the field.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

What is claimed is:

1. A pressure joint assembly for sealing first and second pipes having mutually confronting first and second pipe end flanges respectively, the assembly configured to hold the pipe end flanges in non-abutting fixed relationship to each other, the assembly comprising:

a generally cylindrical cover spanning the first and second pipe end flanges and releasably fixed to the first and second pipe end flanges;

first and second seal elements radially disposed between the first and second pipe end flanges, respectively, and the cover;

a device configured to apply an axial compressive force to the first and second seal elements;

first and second cover flange elements disposed at a respective first and a second end of the cover and projecting radially inwardly from the cover;

and first and second retaining elements that are axially fixed relative to the first and second pipe end flanges respectively, the first and second retaining elements being operative under the axial compressive force to axially trap the first and second seal elements between the first and second retaining elements and respective first and second cover flange elements, wherein at least one of the first and second cover flange elements projecting from the cover is radially inwardly demountable from the cover while the cover is located over the pipe end flanges.

2. The pressure joint assembly as recited in claim 1, wherein the first and second seal elements are configured to seal with a wedging action when the axial compressive force is applied to the cover.

3. The pressure joint assembly as recited in claim 2, wherein the first and second seal elements each include seal rings having mutually abutting surfaces, the abutting surfaces being inclined relative to an axis of the pipe end flanges to facilitate the wedging action.

4. The pressure joint assembly as recited in claim 3, wherein the abutting surfaces are inclined relative to each other such that at least one of the seal rings is radially tapered.

5. The pressure joint assembly as recited in claim 1, wherein the first and second seal elements each include at least two seal rings disposed on each of the first and second pipe end flanges.

6. The pressure joint assembly as recited in claim 5, wherein at least one of the first and second seal elements includes four seal rings.

7. The pressure joint assembly as recited in claim 6, wherein the four seal rings include two pressure rings and two sealing rings disposed between the two pressure rings, the sealing rings having respective abutments with the pressure rings, the abutments with the pressure rings being inclined to an axis of the pipe end flanges and operative to cause wedging of the sealing rings and the pressure rings in opposing axial and radial directions when the axial compressive force is applied to the cover.

8. The pressure joint assembly as recited in claim 7, wherein the two sealing rings are concentrically arranged, one sealing ring being located radially within the other sealing ring, the abutments of the sealing rings with the pressure rings being inclined towards each other such that the radially inner sealing ring is tapered in the radially outward direction and the radially outer sealing ring is tapered in the radially inward direction.

9. The pressure joint assembly as recited in claim 7, wherein one of the two pressure rings further abuts one of the first and second cover flange elements and the other pressure ring further abuts one of the first and second retaining elements.

10. The pressure joint assembly as recited in claim 5, wherein the at least two seal rings include at least a sealing ring and a pressure ring, the sealing ring having an abutment with the pressure ring inclined to an axis of the pipe end flanges and operative to cause wedging of the sealing ring and the pressure ring in opposing axial and radial directions when the axial compressive force is applied to the cover.

11. The pressure joint assembly as recited in claim 10, wherein a first side of the pressure ring abuts a first side of the sealing ring and a second side of the pressure ring abuts one of the first and second retaining elements.

12. The pressure joint assembly as recited in claim 11, wherein a second side of the sealing ring abuts one of the first and second cover flange elements.

13. The pressure joint assembly as recited in claim 10, wherein first and second sides of the sealing ring are inclined towards each other such that the sealing ring is tapered in a radial direction.

14. The pressure joint assembly as recited in claim 1, wherein the first and second retaining elements include rings projecting radially outwardly from corresponding recesses in the pipe end flanges.

15. The pressure joint assembly as recited in claim 1, wherein the device configured to apply an axial compressive force includes first and second end pieces bolted to respective opposing ends of the cover and to the first and second pipe end flanges, the device fixing the cover over the first and second pipes.

16. A pressure joint assembly kit, suitable for connecting two aligned pipes having non-abutting pipe end flanges, comprising:
a generally cylindrical cover securable to the pipe end flanges to hold the pipes rigidly together; a plurality of seal rings operative to form a fluid tight seal between each pipe end flange and the cover;
a first cover flange element projecting radially inwardly from the cover for abutting against one of the seal rings; a second cover flange element projecting radially inwardly from the cover for abutting against another of the seal rings, at least the second radially inwardly projecting cover flange element being radially inwardly demountable towards the pipe end flanges from the cover while the cover is located over the pipe end flanges; and
first and second removable annular retaining elements for axially trapping the seal rings between the first and second retaining elements and the first and second radially inwardly projecting cover flange elements, respectively, wherein each of the seal rings and the retaining elements have an outer diameter corresponding to an inner diameter of the cover such that when the second inwardly projecting cover flange element is demounted from the cover, the cover is axially slideable over the seal rings and the retaining element for assembly and disassembly of the joint.

17. The pressure joint assembly kit as recited in claim 16, wherein each of the seal rings have an inner diameter corresponding to an inner diameter of the first inwardly projecting cover flange element of the cover.

18. The pressure joint assembly kit as recited in claim 16, wherein the first and second inwardly projecting cover flange elements and the respectively abutting seal rings are configured to seal the joint with a wedging action upon application of an axial compressive force to the cover.

19. The pressure joint assembly kit as recited in claim 18, the removable annular retaining elements being insertable into respective recesses in the pipe end flanges to secure the seal rings axially against the axial compressive force.

20. The pressure joint assembly kit as recited in claim 16, wherein each removable annular retaining element includes a plurality of segments.

* * * * *